2,922,816

METHOD FOR THE PREPARATION OF TRIFLUOROACETYL FLUORIDE

John MacMillan Bruce, Jr., Wilmington, Del., assignor to E. I. du Pont de Nemours and Company, Wilmington, Del., a corporation of Delaware No Drawing. Application April 30, 1958
Serial No. 731,869

7 Claims. (Cl. 260—544)

The present invention relates to the preparation of trifluoroacetic acid, and more particularly to the preparation of trifluoroacetic acid and derivatives thereof by the oxidation of tetrafluoroethylene.

Trifluoroacetic acid, a strong organic acid, has many useful applications and is a highly valuable chemical intermediate. The use of trifluoroacetic acid and derivatives thereof has, however, been strictly limited due to the high cost of producing the acid.

It is therefore the object of the present invention to provide a novel and economic process for the preparation of trifluoroacetic acid and derivatives thereof.

This and other objects are accomplished by a process which comprises contacting at a temperature of 140° to 225° C. a mixture of tetrafluoroethylene and oxygen, preferably in dilute form, with a catalyst of the class consisting of finely divided carbon and silver oxide. As carbon catalysts there may be employed any form of finely divided carbon, but commercially available carbon catalysts derived from cellulosic materials, and particularly activated coconut or wood charcoal are preferred. Although not necessary, it is also preferred to heat the carbon catalyst in an inert atmosphere at temperatures of 200 to 400° C. prior to use, to remove any traces of compounds which might poison the catalytic activity of the carbon. The silver oxide catalysts which are useful include catalysts having silver oxide distributed on inert carriers such as alumina, silica, titania, zirconia, etc. The silver oxide may be dispersed on the carrier with various other metallic oxides and peroxides, such as alkaline earth metal oxides and peroxides, zinc or copper oxides which act as promoters for the oxidation. The method of preparing supported silver oxide catalysts is well known and therefore not specifically described.

The reaction of tetrafluoroethylene with oxygen is highly exothermic and it is therefore necessary to control the quantity of oxygen to maintain the reaction temperature within the operative range. If the temperature is not maintained within the operative range, carbonyl fluoride rather than trifluoroacetyl fluoride is essentially the sole product formed. A similar result is obtained when the reaction is carried out in the absence of the catalysts disclosed hereinabove. The reaction temperature is most readily controlled by the addition of inert gaseous diluents such as nitrogen and/or employing an excess of tetrafluoroethylene. Air oxidation is therefore greatly preferred, particularly in the presence of excess tetrafluoroethylene. The volumetric ratio of tetrafluoroethylene to oxygen should be at least greater than ten. The optimum proportions of reagents which, when employed in this process, give rise to high conversions combined with high yields will vary and depend to a great extent on such factors as contact times, pressure and type of reaction zone employed. However, if the temperature of the reaction is maintained between 140 and 225° C. and preferably between 150 to 190° C., trifluoroacetyl fluoride will be formed in substantial quantities. The contact time of the reaction mixture with the catalyst may vary from less than one second to as high as one minute. Pressures may vary from subatmospheric to pressures greater than one atmosphere. However, since there is no particular advantage in employing either subatmospheric pressure or high pressures, atmospheric pressure is generally employed.

The reaction may be carried out in any suitable gas phase reaction vessel. Thus one may employ reaction vessels with fixed or moving catalyst beds or reactors containing the catalyst in fluidized form. The catalyst may be continuously regenerated by heating in an inert gas stream or may be used until exhausted and then regenerated. The continuous regeneration is preferred since catalytic activity is significantly higher, giving rise to higher conversion to and higher yield of trifluoroacetyl fluoride, in the initial stages of the reaction, such as is the first two hours, than in the latter stages, such as after thirty hours. The reactor is preferably constructed of a material which is resistant to fluorine as well as acid. Thus suitable materials of construction are stainless steel and other corrosion resistant steel alloys, silver, platinum, etc.

The oxidation of tetrafluoroethylene in accordance with the present invention results in the formation of trifluoroacetyl fluoride which is highly reactive and can readily be converted into a large number of derivatives. Thus, on contact with water the acetylfluoride forms trifluoroacetic acid. When contacted with a base, such as sodium hydroxide, a salt is obtained. When the acid fluoride is contacted with an alcohol the corresponding ester is obtained. Similarly it is possible to form the amide by contact with an amine. Due to the high reactivity of the trifluoroacetyl fluoride it is therefore possible to form a large number of derivatives of trifluoroacetyl fluoride directly from the oxidation products. The ready formation of derivatives may also be employed to separate the trifluoroacetyl fluoride from the remainder of the reaction products.

The present invention is further illustrated by the following examples:

Example I

In the center of a 17" stainless steel tube having an inner diameter of 13/16" and containing a thermocouple well, there was placed on a stainless steel screen 35 cm.$^3$ of 4 to 6 mesh, commercially available (Columbia Co. grade CXA) charcoal. The tube was mounted vertically in a 13" multiple unit electrical heater and the temperature was measured by thermocouples placed inside the steel tube. The reactant gases were separately fed to the top of the tube and then combined at that point. The reaction products were collected from the bottom of the tube and passed through two water traps.

The unit was heated to 157 to 163° C. and tetrafluoroethylene and air were passed through the column at flow rates of 80 cm.$^3$/min. and 24 cm.$^3$/min., respectively. The trifluoroacetyl fluoride was hydrolyzed in the water traps, the contents of which after 5.75 hours of operation were titrated with sodium hydroxide. A conversion of 4.5% and a yield of 75% of trifluoroacetyl fluoride, titrated as trifluoroacetic acid, was obtained.

Example II

Employing the equipment and procedure of Example I, 33 cm.$^3$ of 40 to 60 mesh charcoal catalyst (Columbia Co. grade CXA) was heated in a stream of nitrogen at 600° C. for 16 hours. Following this treatment, tetrafluoroethylene and air were fed into the reaction tube at a rate of 80 cm.$^3$/min. and 35 cm.$^3$/min., respectively. The temperature was maintained at 185–191° C. In the first two hours no oxidation occurred. Then for 45 minutes only trifluoroacetyl fluoride was produced at a conversion of 2.7% and a 100% yield. Thereafter the yield slowly decreased as the formation of carbonyl fluoride occurred.

*Example III*

Employing the procedure and equipment of Example I, tetrafluoroethylene was oxidized with a supported silver oxide catalyst. The silver catalyst was prepared by dissolving 25 g. of silver nitrate, 0.25 g. of cupric nitrate in 500 ml. of water; to this solution was added 7.9 g. of sodium hydroxide in 275 ml. of water. The resulting precipitate was mixed with 2.75 g. of barium peroxide and 61.5 g. of 60 mesh alumina and 60 ml. of water. The water was evaporated with stirring. The resulting product was dried at 110° C. Into the reaction tube was charged 30 cm.³ of this catalyst. The reaction was heated to 186° C. and tetrafluoroethylene and air were passed into the reaction tube at the rate of 140 cm.³/min. and 30 cm.³/min., respectively. Two products were isolated, carbonyl fluoride and trifluoroacetyl fluoride. Infrared analysis showed that the product contained 37 weight percent of trifluoroacetyl fluoride and 10.8% of carbonyl fluoride. The conversion was approximately 15%.

*Example IV*

Using the catalyst and procedure of Example III, tetrafluoroethylene was oxidized at a temperature of 205° C. Tetrafluoroethylene was charged at the rate of 90 cm.³/min. to the reactor, air at the rate of 20 cm.³/min. and nitrogen was charged as additional diluent at the rate of 70 cm.³/min. The products obtained from the reactor were passed through n-butanol for a period of 7 hours. The resulting solution was fractionated and an azeotrope of n-butylperfluoroacetate and n-butanol was obtained. Analysis of the various fractions indicated the following compositions: 1.7 g. of 94% pure n-butyl trifluoroacetate, B.P. 83° C.; 0.8 g. of 86% pure n-butyl trifluoroacetate, B.P. 90° C.; and 1.8 g. of a 50% n-butyl trifluoroacetate.

The examples have illustrated the process of the present invention and are not intended to limit the invention thereto, various known modifications of reactor construction, catalyst support and product purification being within the scope of the invention. It is to be noted that the present process differs from oxidation of fluoroolefins as known heretofore in that the present process does not involve splitting of a double bond, but is based on oxygen attacking the double bond and causing a rearrangement.

I claim:

1. Process for the preparation of trifluoroacetyl fluoride which comprises contacting a mixture of tetrafluoroethylene and oxygen at a temperature of 140 to 225° C. with a catalyst of the class consisting of carbon and silver oxide, and recovering trifluoroacetyl fluoride.

2. Process as set forth in claim 1 wherein tetrafluoroethylene and oxygen are admixed with an inert diluent.

3. Process as set forth in claim 1 wherein tetrafluoroethylene is admixed with air.

4. Process for the preparation of trifluoroacetyl fluoride which comprises contacting a mixture of tetrafluoroethylene and air at a temperature of 140 to 225° C. with carbon and separating trifluoroacetyl fluoride from the products resulting.

5. Process for the preparation of trifluoroacetyl fluoride which comprises contacting a mixture of excess tetrafluoroethylene and air with activated charcoal at a temperature of 140 to 225° C. and separating trifluoroacetyl fluoride from the products resulting.

6. Process for the preparation of trifluoroacetyl fluoride which comprises contacting a mixture of tetrafluoroethylene and air at a temperature of 140 to 225° C. with silver oxide and separating trifluoroacetyl fluoride from the products resulting.

7. Process for the preparation of trifluoroacetyl fluoride which comprises contacting a mixture of excess tetrafluoroethylene and air at a temperature of 140 to 225° C. with silver oxide distributed on an inert carrier and separating trifluoroacetyl fluoride from the products resulting.

References Cited in the file of this patent

UNITED STATES PATENTS

| | | |
|---|---|---|
| 2,676,983 | Hurka | Apr. 27, 1954 |
| 2,717,871 | Scholberg et al. | Sept. 13, 1955 |